US006647033B1

(12) United States Patent
Smith et al.

(10) Patent No.: US 6,647,033 B1
(45) Date of Patent: Nov. 11, 2003

(54) OPTICAL PARAMETRIC OSICLLATORS WITH IMPROVED BEAM QUALITY

(75) Inventors: Arlee V. Smith, Albuquerque, NM (US); William J. Alford, Albuquerque, NM (US)

(73) Assignee: Sandia Corporation, Albuquerque, NM (US)

( * ) Notice: Subject to any disclaimer, the term of this patent is extended or adjusted under 35 U.S.C. 154(b) by 87 days.

(21) Appl. No.: 09/846,445

(22) Filed: Apr. 30, 2001

(51) Int. Cl.[7] .............................. H01S 3/10; H01S 3/08
(52) U.S. Cl. ............................ 372/21; 372/92; 372/97; 372/98; 372/100; 372/101
(58) Field of Search .............................. 372/21, 22, 23, 372/100, 101, 97, 98, 92; 359/330, 346

(56) References Cited

U.S. PATENT DOCUMENTS

| | | | | |
|---|---|---|---|---|
| 5,341,236 A | * | 8/1994 | Stappaerts | 359/328 |
| 5,390,211 A | | 2/1995 | Clark et al. | 372/95 |
| 5,781,571 A | * | 7/1998 | Nabors et al. | 372/21 |
| 6,147,793 A | | 11/2000 | Alford et al. | 359/330 |

OTHER PUBLICATIONS

A.V.Smith, Mark S. Bowers, Image–rotating cavity designs for improved beam quality in nanosecond optical parametric oscillation, May 5, 2000.*
Anstett, G., Goritz, G., Kabs, D., Urschel, R. Wallenstein, R., and Borsutzky, A., "Reduction of the spectral width and beam divergence of a BBO–)P) by using collinear type–II phase matching and back reflection of the pump beam," 2001, Appl. Phys. B, Digital Object Identifier 10.1007/s003400100533.

Smith, A. and Bowers, M., "Image–rotating cavity designs for improved beam quality in nanosecond optical parametric oscillators," May 5, 2000, presented at University of Kaiserslautern, Kaiserslautern, Germany.

Anan'ev, Y.A., *Laser resonators and beam divergence problem*, 1992, Adam Hilger, New York, 321–327.

Siegman, A., "Defining the effective radius of curvature for a nonideal optical beam," 1991, IEEE J. of Quantum Electronics, 27, 5, 1146–1148.

* cited by examiner

*Primary Examiner*—Quyen Leung
*Assistant Examiner*—Armando Rodriguez
(74) *Attorney, Agent, or Firm*—Elmer A. Klavetter

(57) ABSTRACT

An optical parametric oscillator (OPO) having an optical pump, which generates a pump beam at a pump frequency greater than a desired signal frequency, a nonlinear optical medium oriented so that a signal wave at the desired signal frequency and a corresponding idler wave are produced when the pump beam (wave) propagates through the nonlinear optical medium, resulting in beam walk off of the signal and idler waves, and an optical cavity which directs the signal wave to repeatedly pass through the nonlinear optical medium, said optical cavity comprising an equivalently even number of non-planar mirrors that produce image rotation on each pass through the nonlinear optical medium. Utilizing beam walk off where the signal wave and said idler wave have nonparallel Poynting vectors in the nonlinear medium and image rotation, a correlation zone of distance equal to approximately $\rho L_{crystal}$ is created which, through multiple passes through the nonlinear medium, improves the beam quality of the OPO output.

9 Claims, 5 Drawing Sheets

OPTICAL PARAMETRIC OSICLLATORS WITH IMPROVED BEAM QUALITY

This invention was made with Government support under Contract No. DE-AC04-94AL85000 awarded by the Department of Energy. The Government has certain rights in the invention.

BACKGROUND OF THE INVENTION

The invention relates to an optical parametric oscillator and more particularly to optical parametric oscillator designs utilizing image-rotating cavity designs and beam walk-off.

Optical parametric amplification (OPA) is a nonlinear optical process whereby light at one wavelength, the pump wavelength, is used to generate light at two other (longer) wavelengths in a nonlinear optical material with a nonvanishing second order nonlinear susceptibility. Optical gain is established at two wavelengths, conventionally referred to as the signal and idler wavelengths. The sum of the energies of a signal photon and an idler photon are equal to the energy of a pump photon. There is no fundamental physical distinction between the idler wave and the signal wave. An optical parametric oscillator (OPO) is a resonant optical cavity containing a nonlinear material which provides OPA when pumped by a beam of laser radiation at a pump frequency from a pump source.

The content and orientation of the crystal and the design of the resonant cavity determines the signal and idler frequencies. The gain within the nonlinear medium combined with feedback within the resonant cavity permits oscillation, a process similar to build-up in a laser cavity. The cavity can either be singly resonant in which end mirrors reflect only the signal frequency or doubly resonant in which end mirrors reflect both signal and idler frequencies. End mirrors of the OPO are often transparent to the pump frequency, although they reflect the pump in some designs. OPOs with singly resonant cavities are typically more stable in their output than OPOs with doubly resonant cavities.

A schematic diagram of a prior art OPO appears in FIG. 1 (e.g., see Alford et al., U.S. Pat. No. 6,147,793, issued on Nov. 14, 2000). The pump 10 provides a source of intense coherent radiation in the form of the pump wave 14. A suitable nonlinear optical material 13 is placed in the optical cavity formed by mirrors 11 and 12. Mirror 11 is essentially transparent to pump wave 14, thereby providing a pump source to nonlinear optical material 13. Mirror 12 is partially transparent to the signal wave 16, which along with the idler wave 15 is generated by nonlinear interaction of pump wave 14 with nonlinear optical material 13. For simplicity, FIG. 1 shows all three waves propagating along a phasematch or quasi-phasematch direction within nonlinear optical material 13, a situation known as collinear phase matching. More generally, collinearity of the three waves is not required for OPO function.

An average photon from signal wave 16 makes multiple passes through nonlinear optical medium 13 before escaping from the optical cavity through mirror 12. Such apparatus can provide reasonably efficient (10–40%) conversion of pump photons into signal photons. Like excited optical laser media, OPA involves optical gain and amplification of light. In laser media, however, there is no fundamental relationship between the coherence or lack thereof of the excitation energy and the laser radiation. In contrast, in OPA the pump source must be coherent light, and the output energy is coherently coupled and phase-locked to the laser pump.

To obtain a useful device, it is necessary to be able to choose a specific signal wavelength. This is made possible within the nonlinear material itself, as useful gain appears only when the pump wave, the signal wave, and the idler wave can propagate and stay in phase with each other. This phase matching condition is difficult to establish. Optical materials generally exhibit a property called dispersion, in which the refractive index varies with wavelength. Normally, shorter wavelength light propagates more slowly than do longer wavelengths. Consequently, as waves with different frequencies propagate they rapidly move in and out of phase with each other. The resulting interference prevents the signal wave from experiencing significant optical gain. The most common ways of phase matching are to take advantage of birefrigence often present in nonlinear crystals or to quasi-phase match by periodically changing the orientation of the nonlinear crystal to periodically rephase the pump, signal, and idler waves.

Because of constraints imposed by crystal nonlinearities and damage thresholds, scaling a pulsed OPO from low to high energy implies increasing the beam diameters while keeping the fluences, crystal lengths, and cavity length relatively unchanged. The result is a high-Fresnel-number ($N_F$, where $N_F = d^2 \lambda L$; d is the beam diameter, $\lambda$ is the frequency and L is the cavity length) cavity that can support many transverse modes, often resulting in poor beam quality.

Beams from OPO's with small Fresnel numbers are often nearly diffraction limited because diffraction couples all transverse regions of the beams. However, as the beam diameters are increased to large Fresnel numbers, different portions of the beams uncouple and develop more or less independently of one another in cavities with flat mirrors. This allows uncorrelated phase and amplitude variations across the beam profile, resulting in poor beam quality. To improve the beam quality, all regions of the signal and idler beams must communicate in a way that establishes a more uniform phase and amplitude across the beams. One way to do this is to use a confocal unstable resonator (Clark et al., U.S. Pat. No. 5,390,211, issued on Feb. 14, 1995). Light originally oscillating near the cavity axis gradually spreads over the entire beam diameter by diffraction and cavity magnification. Light is also continuously lost from the edges of the gain region for the same reasons, so after a few round trips of the cavity all the resonated light has a common ancestry and, for proper cavity alignment, a common phase.

Another optical parametric oscillator system that provides an improved beam is described by Nabors et al. (U.S. Pat. No. 5,781,571, issued on Jul. 14, 1998), utilizing an elongated resonant cavity with an output coupling device at one end and a Porro prism at the opposite end. Anstett et al. (G. Anstett, G. Goritz, D. Kabs, R. Urschel, R. Wallenstein, and A. Borsutzky, 2001, Appl. Phys. B., DOI 10.1007) describe a method for reducing beam divergence using collinear type-II phase matching and back reflection of the pump beam. Alford et al. (U.S. Pat. No. 6,147,793, issued on Nov. 14, 2000) also describe a class of optical parametric oscillators that introduce means for reducing signal losses due to backconversion of signal photons in the nonlinear optical medium. Elimination of backconversion results in improved beam quality compared with an OPO in which backconversion is present.

Another way to communicate phase across the beam is by spatial walk off between the signal and idler beams, combined with image rotations (Smith, A. and Bowers, M., presented at University of Kaiserslautern, Kaiserslautern, Germany, May 5, 2000; incorporated herein by reference). Walk off, which describes the angle difference p between the signal and idler Poynting vectors in the crystal (nonlinear medium), tends to smooth the phase of the signal beam over regions that interact with a particular portion of the idler beam. For a single pass through the crystal, this is a stripe of length equal to the walk off displacement within the crystal. Over successive passes of an OPO cavity, the stripe lengthens by this amount on each pass. This leads to a set of stripes of uniform phase oriented parallel to the walk off direction but with an independent phase for each stripe.

DETAILED DESCRIPTION OF THE INVENTION

An optical parametric oscillator (OPO) is an optical device pumped by a coherent light source, such as a laser, that generates waves (radiation) in a nonlinear medium within a resonant optical cavity. The present invention utilizes beam walk off and true image rotation to make OPOs with improved beam quality. Beam walk off can be due to crystal birefringence, in which the signal wave or beam is an extraordinary wave and the idler wave is an ordinary wave, or vice versa, and is caused by the nonlinear medium (crystal) utilized in the OPO. Alternatively, beam walk-off can be induced by tilting the pump beam relative to the signal beam, causing the idler wave to tilt relative to the signal beam. True image rotation, in which each transverse point in the beam is translated to a new position, rotated about a single central point by a common angle (e.g., 45 or 90 degrees) from its original position, is utilized on each cavity pass to induce a uniform phase across the entire beam and thus improve the beam quality. The pump wave generates, through optical parametric amplification, light at two longer wavelengths. These light waves (radiation) are known as the signal wave and the idler wave. For the present invention, the signal and idler waves must have nonparallel Poynting vectors in the crystal. This is true for Type II mixing with collinear pumping and can be easily achieved for Type I mixing by tilting the pump beam relative to the cavity axis. On successive passes, each portion of the laser beam samples different gain regions, averaging to some extent the gain and refractive index inhomogeneities. The mechanism utilized herein is not gain averaging (Anan'ev, Y. A., Laser resonators and beam divergence problem, 1992, Adam Hilger, N.Y., 321–327) but the establishment of phase and amplitude correlations across the signal and idler beams due to lateral walk off between them as they propagate through the crystal. For Type II mixing, the birefringent walk off in a single pass of a critically matched crystal is typically 0.1–1 mm.

Figure 1:
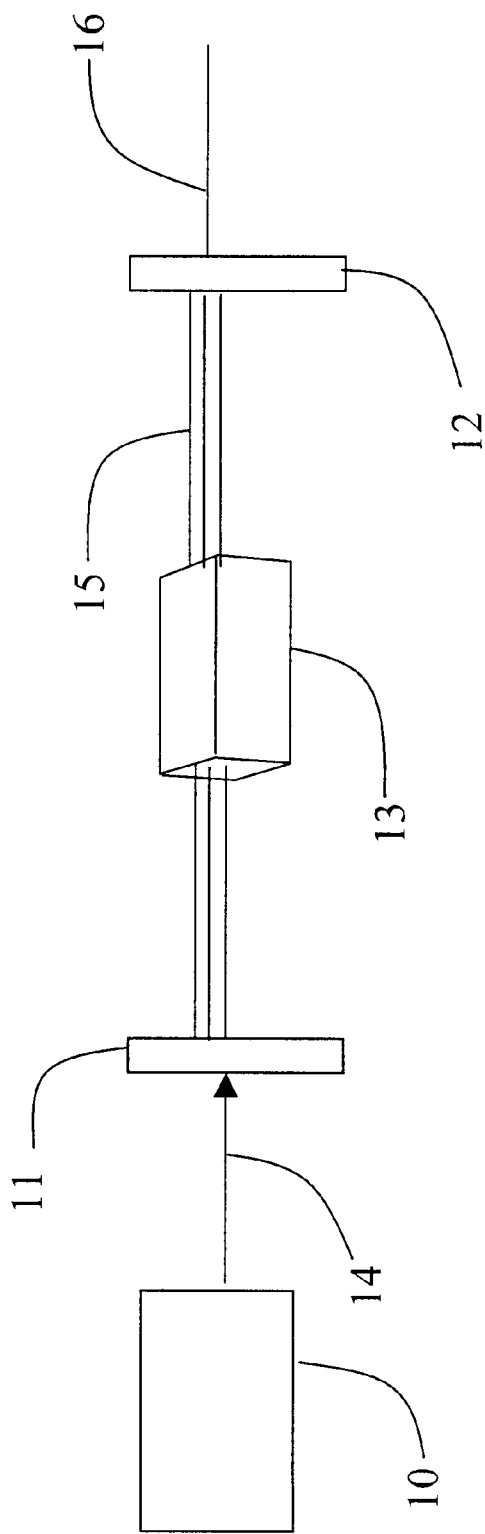
FIG. 1 illustrates a prior art optical parametric oscillator.
Figure 2:
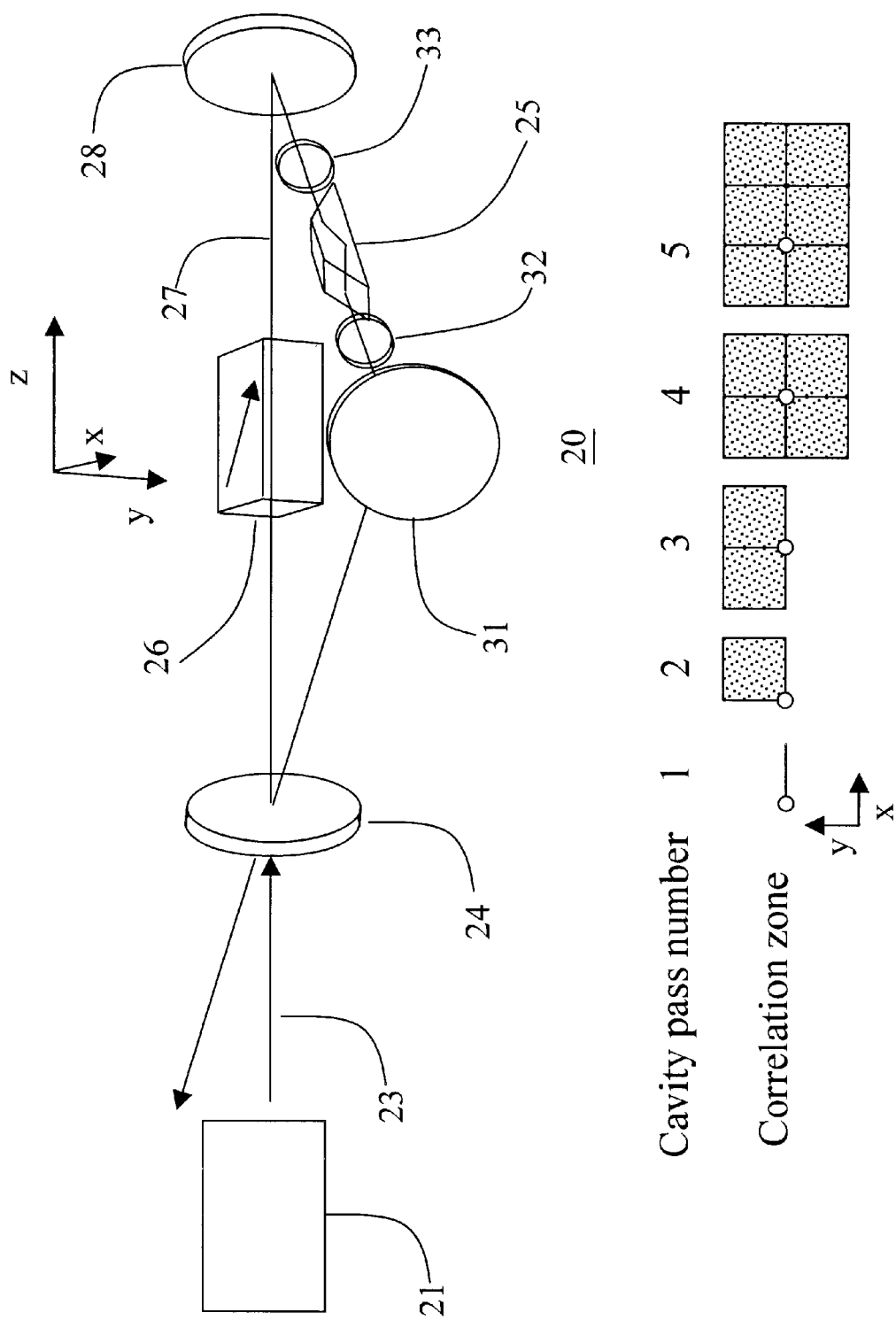
FIG. 2 illustrates one embodiment of the optical parametric oscillator of the present invention utilizing a ring configuration.

In the present invention, true image rotation is accomplished by utilizing an equivalent even number of non-planar mirrors in the optical parametric oscillator system, with a minimum number of four equivalent mirrors required. The cavity can be formed using a ring configuration or by using a linear configuration. In the optical parametric oscillator system of the present invention, both prisms and mirrors can be used. In one embodiment of a ring configuration OPO 20 using both mirrors and prisms, illustrated in FIG. 2, three mirrors are utilized together with a Dove prism 25, where the Dove prism functions equivalently as three mirrors, for an equivalent six non-planar mirrors system. In FIG. 2, 90° image rotation is achieved by rotating the prism 25 to a 45° angle relative to the ring plane, but other angles and degrees of image rotation can be utilized. Other prisms can also be utilized, such as porro prisms, roof top prisms, and penta prisms, with the type of prism utilized determining how many equivalent mirrors the prism represents. FIG. 2 shows an embodiment of an image-rotating optical parametric oscillator 20, along with a diagram of the correlation zones for successive beam passes. An optical pump 21 (such as a pump laser, as a nanosecond pulsed laser, and more particularly, a Q-switched solid state laser) generates a pump beam (wave) 23 with a suitable intensity at a pump frequency greater than a desired signal frequency. The pump beam 23 passes through a first mirror 24 that directs the beam through a nonlinear optical medium 26 (generally a crystal) of length $L_{crystal}$, producing a signal wave and an idler wave in the beam 27 that subsequently is directed by a second mirror 28 through a Dove prism 25 to a third mirror 31 which directs the beam back to mirror 24. Mirror 24 is at least partially transmissive to the pump beam 23, and is at least partially reflective to the signal beam to allow multiple passes in the optical cavity. The second mirror 28 is at least partially reflective to the signal beam 27. Mirror 31 is at least partially reflective to the signal beam. Waveplates 32 and 33 before and after the prism 25 align the signal beam polarization to an eigenpolarization of the Dove prism to avoid depolarization. The dove prism is rotated 45° relative to the ring plane to achieve signal beam rotation by 90° on each round trip of the beam in the cavity. The diagrams in FIG. 2 of the correlation zones show how the signal field initially at the origin develops zones connected by idler walk off and image rotation. After the first pass through the crystal, where beam walk off between the signal and idler is induced, a correlation zone is created that extends in the x, or walk off direction, a distance equal to the single pass idler walk off $\rho L_{crystal}$. Here $\rho$ is the angle between signal and idler Poynting vectors in the crystal, whether due to birefringence or noncollinear pumping. This is shown under pass number 1. This line is rotated counter clockwise 90° by image rotation in the cavity so that on the next pass through the crystal the walk off again creates correlations in the x direction, as shown in pass number 2. Repetition of the counter clockwise rotation plus walk off on successive crystal passes creates the growing correlation zones diagrammed. The number of passes required to achieve successful correlation varies with the system and depends on the walk off $\rho L_{crystal}$, the gain in the crystal, the mirror reflectivity, and the pump beam diameter. In general, to achieve successful correlation, the approximate minimum of number of passes required is determined when the number of passes times $\rho L_{crystal}$ equals the beam diameter.

Figure 3:
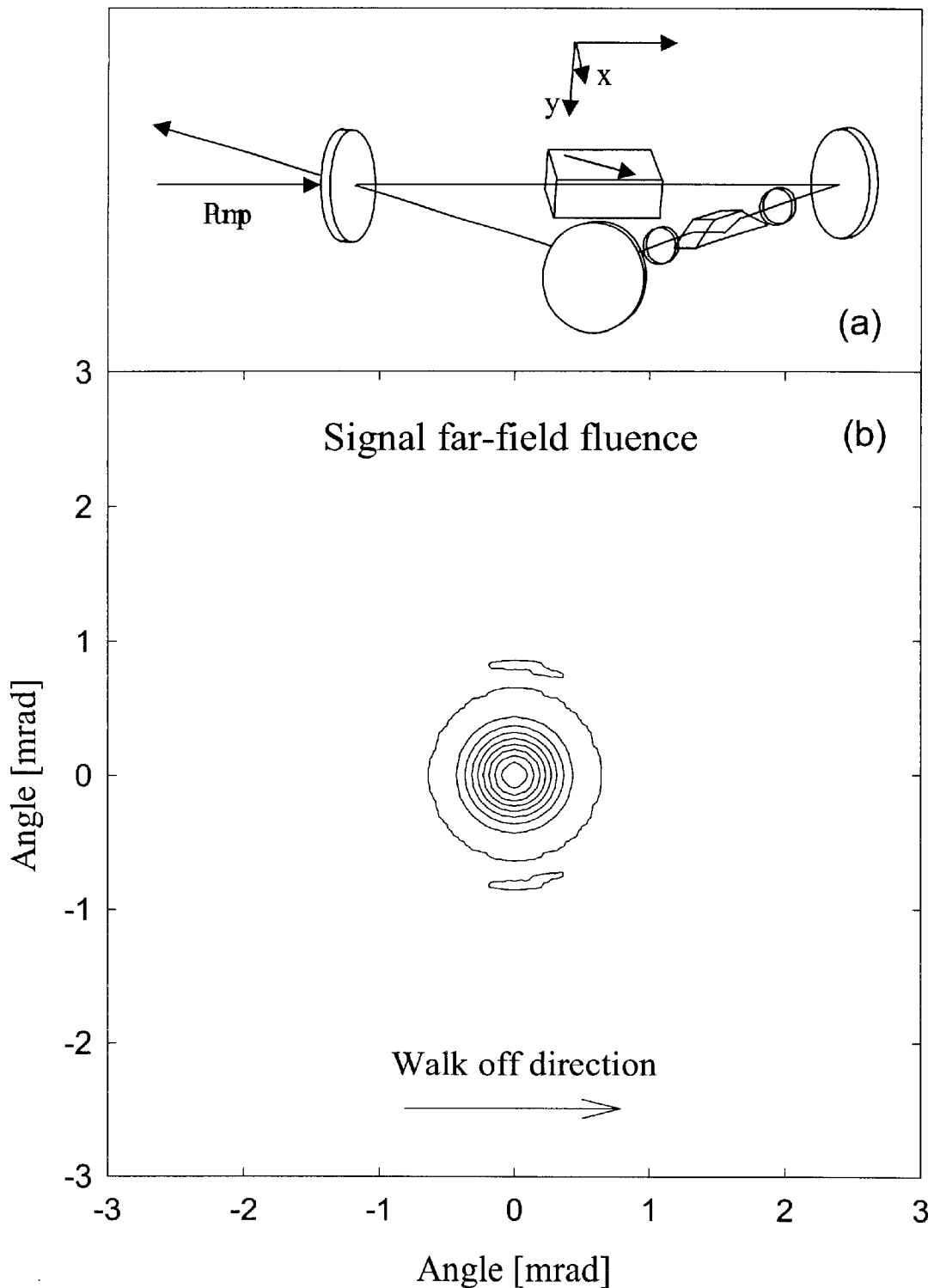
FIG. 3 shows the far-field signal fluence.
Figure 4:
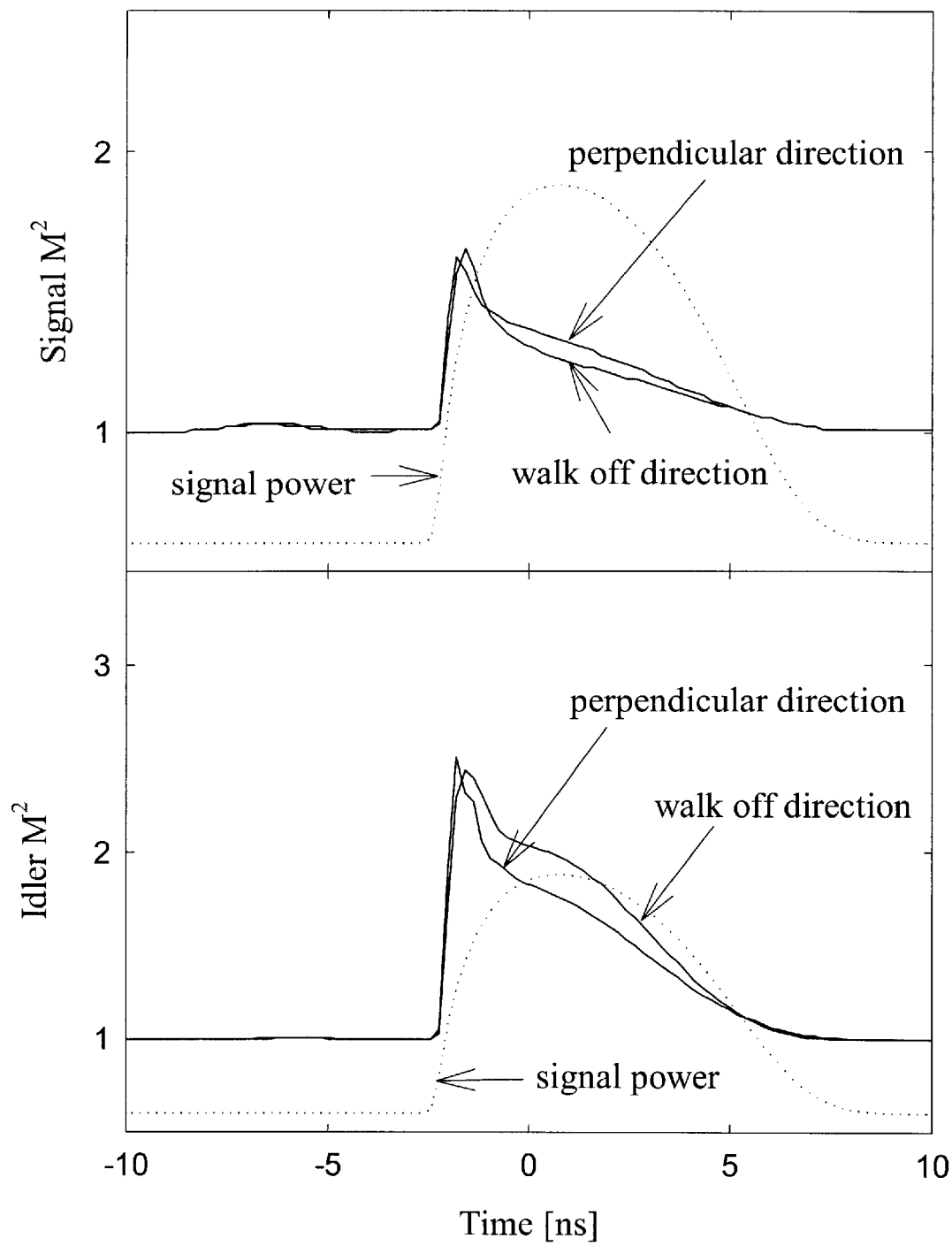
FIG. 4 shows the corresponding $M^2$ values for the embodiment of FIG. 2.

FIG. 3 displays the nearly symmetric far-field signal fluence computed for this device, based on a pump wavelength of 1064 nm with a signal and idler wavelength of 1700 nm and 2844 nm, respectively, with a pump input power of 0.1 J, and a pulse duration of 7 ns. FIG. 4 shows the corresponding $M^2$ values, along with the reference normalized signal power, demonstrating the effectiveness of image rotation in the low values for the signal $M^2$ in both directions. $M^2$ values provide an indication of the beam quality. (A. E. Siegman, IEEE J. Quant. Electron. 27,1146–1148 (1991)). The $M^2$ values in conventional OPOs range from 3 to 6 or higher, as compared with $M^2$ values in the present invention of just over 1 to less than approximately 1.5 for the signal wave, where 1 is the idealized and desired value.

Figure 5:
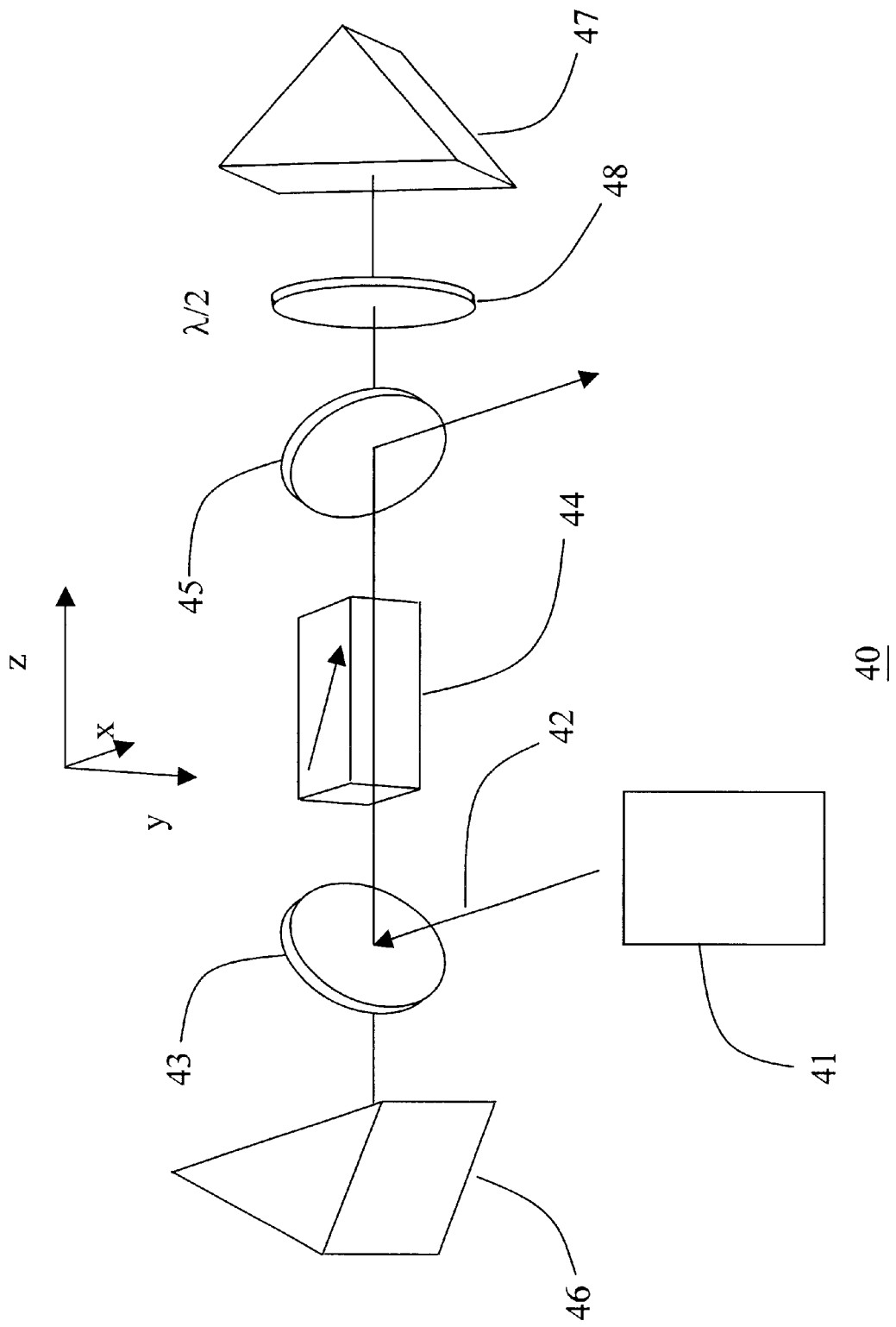
FIG. 5 illustrates another embodiment of the optical parametric oscillator system of the present invention.

FIG. 5 illustrates another embodiment of the present invention, optical parametric oscillator system 40, with this system employing a linear configuration. In this embodiment, the optical pump 41 generates a pump beam 42 with a suitable intensity at a pump frequency greater than a desired signal frequency. The pump beam 42 reflects off a first mirror 43 that directs the beam through the crystal 44 to a second mirror 45 that reflects the pump beam out of the cavity. The two roof prisms 46 and 47 form the optical cavity for the resonated wave, generally the signal wave portion of the beam (the resonated wave can be designated as the signal wave if only one wave is resonated). They are equivalent to two mirrors each, providing an equivalent four non-planar mirrors. Both mirrors 43 and 45 are at least partially transmissive to the signal beam as the beam makes successive passes between the prisms. At least one of the mirrors must be at least partially reflective to the signal beam to provide output coupling of the signal. In this embodiment, prism 47 is rotated relative to the mirror plane (and the plane of the other prism and the crystal) to achieve image rotation on each pass; rotation of the prism by 45° relative to the plane achieves 90° image rotation on each pass. Because of the prism rotation, a waveplate 48 is utilized between the nonlinear medium and the rotated prism to align the signal beam polarization. According to numerical simulations, this system design can be used also if the pump beam is retroreflected for a double pass of the crystal and the idler is rejected after each pass of the crystal.

Suitable nonlinear optical media include $KTiOPO_4$ (KTP) and its isomorphs, $KH_2PO_4$ (KDP) and its isomorphs, $LiNbO_3$ and its isomorphs, potassium pentaborate tetrahydrate (KB5) and its isomorphs, lithium formate (LFM) and its isomorphs, $Ca_4GdO(BO_3)_3$ and its isomorphs, Se, Te, III–V semiconductors, II–VI semiconductors, semiconductor quantum-well materials, HgS (cinnabar), quartz, $Ag_3AsS_3$ (proustite) and its isomorphs, $LiB_3O_5$, $Li_2B_4O_7$, $KBe_2BO_3F_2$, $\beta$-$BaB_2O_4$, $AgGaS_2$, $\alpha$-$HIO_3$, $BaSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$ and its isomorphs, $CsLiB_6O_{10}$, urea, cesium dihydroarsenate and L-arginine phosphate. The instant invention can be implemented using any of the above materials, and any other nonlinear optical materials having suitable properties.

The invention being thus described, it will be apparent that the same may be varied in many ways. Such variations are not to be regarded as a departure from the spirit and scope of the invention, and all such modifications as would be obvious to one skilled in the art are intended to be included within the scope of the following claims.

We claim:

1. An optical parametric oscillator, comprising:

an optical pump, which generates a pump beam at a pump frequency greater than a signal frequency of a signal wave;

a nonlinear optical medium oriented so that the signal wave at the signal frequency and a corresponding idler wave are produced when the pump beam propagates through the nonlinear optical medium, resulting in beam walk off, said beam walk off induced by means selected from birefringence from said nonlinear optical medium and pump beam tilt relative to the signal wave, said signal wave and said idler wave having nonparallel Poynting vectors in said nonlinear optical medium; and an optical cavity in a ring configuration which directs said signal wave to repeatedly pass through the nonlinear optical medium, said optical cavity comprising three mirrors and a Dove prism, with waveplates before and after said Dove prism, said Dove prism rotated relative to the ring plane to produce image rotation on each pass of the pump beam through the nonlinear optical medium.

2. The optical parametric oscillator of claim 1 wherein the optical pump is a pump laser.

3. The optical parametric oscillator of claim 2 herein the pump laser is a nanosecond pulsed laser.

4. The optical parametric oscillator of claim 2 wherein the pump laser is a Q-switched solid state laser.

5. The optical parametric oscillator of claim 1 wherein the nonlinear medium comprises a material selected from $KTiOPO_4$, $KH_2PO_4$, $LiNbO_3$, potassium pentaborate tetrahydrate, lithium formate, $Ca_4GdO(BO_3)_3$, Se, Te, III–V semiconductors, II–VI semiconductors, semiconductor quantum-well materials, HgS, quartz, $Ag_3AsS_3$, $LiB_3O_5$, $Li_2B_4O_7$, $KBe_2BO_3F_2$, $\beta$-$BaB_2O_4$, $AgGaS_2$, $\alpha$-$HIO_3$, $BaSO_4 \cdot 4H_2O$, $HgGa_2S_4$, $ZnGeP_2$ (ZGP), barium-sodium niobate, $Sr_xB_{1-x}Nb_2O_6$ (SBN), $PbB_4O_7$, $CdHg(SCN)_4$, $Gd_2(MoO_4)_3$, $Tl_3AsSe_3$, $CsLiB_6O_{10}$, urea, cesium dihydroarsenate and L-arginine phosphate.

6. The optical parametric oscillator of claim 1 wherein an image rotation of 90° is produced on each pass of the pump beam through the nonlinear optical medium.

7. The optical parametric oscillator of claim 1 wherein said beam walk off induces a correlation zone of distance equal to approximately $\rho L_{crystal}$ where $\rho$ is the angle between signal and idler Poynting vectors in the nonlinear optical medium and $L_{crystal}$ is the length of the nonlinear optical medium.

8. An optical parametric oscillator, comprising:

an optical pump, which generates a pump beam at a pump frequency greater than a signal frequency of a signal wave;

a nonlinear optical medium oriented so that the signal wave at the signal frequency and a corresponding idler wave are produced when the pump beam propagates through the nonlinear optical medium, resulting in beam walk off, said beam walk off induced by means selected from birefringence from said nonlinear optical medium and pump beam tilt relative to the signal wave, said signal wave and said idler wave having nonparallel Poynting vectors in said nonlinear optical medium; and an optical cavity in a linear configuration which directs said signal wave to repeatedly pass through the nonlinear optical medium, said optical cavity comprising two mirrors and two roof prisms aligned linearly, one roof prism rotated relative to the mirror plane with a waveplate disposed between said rotated roof prism and said nonlinear medium, to maintain polarization on each pass of the signal wave through the nonlinear optical medium.

9. The optical parametric oscillator of claim 8 wherein said beam walk off induces a correlation zone of distance equal to approximately $\rho L_{crystal}$ where $\rho$ is the angle between signal and idler Poynting vectors in the nonlinear optical medium and $L_{crystal}$ is the length of the nonlinear optical medium.

* * * * *